United States Patent

Low et al.

[15] 3,662,337

[45] May 9, 1972

[54] MOD 2 SEQUENTIAL FUNCTION GENERATOR FOR MULTIBIT BINARY SEQUENCE

[72] Inventors: George M. Low, Deputy Administrator of the National Aeronautics and Space Administration with respect to an invention of; Tage. O. Anderson, 628 Fairview Ave., Arcadia, Calif. 91006

[22] Filed: Oct. 1, 1970

[21] Appl. No.: 77,221

[52] U.S. Cl. ....................................340/146.1AL, 235/152

[51] Int. Cl. ....................................................G06f 1/02

[58] Field of Search .......................340/146.1, 348; 235/152; 307/216; 328/92

[56] References Cited

UNITED STATES PATENTS 3,474,413 10/1969 Dryden........................340/146.1 AL

*Primary Examiner*—Charles E. Atkinson

*Attorney*—J. H. Warden, Paul F. McCaul and John R. Manning

[57] ABSTRACT

A MOD 2 sequential function generator for a $n$-bit binary sequence comprising a two-bit shift register for each pair of bits in the sequence. The false output of the register serves as the true input to the register. The input and output bits of each register are initially loaded to a 1 and 0 state, respectively. The true outputs of the registers are MOD 2 added to provide the generator's final output.

9 Claims, 7 Drawing Figures

FIG. 1
PRIOR ART
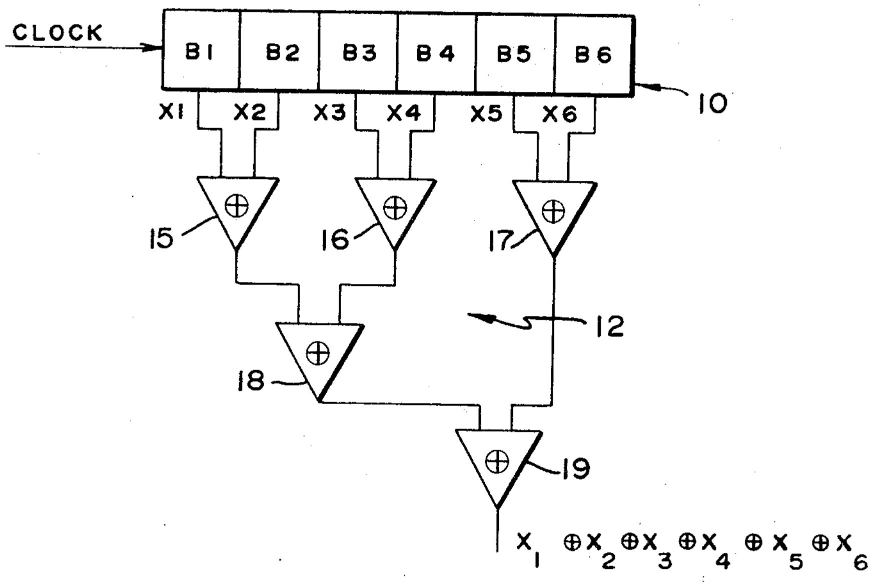
FIG. 2
PRIOR ART
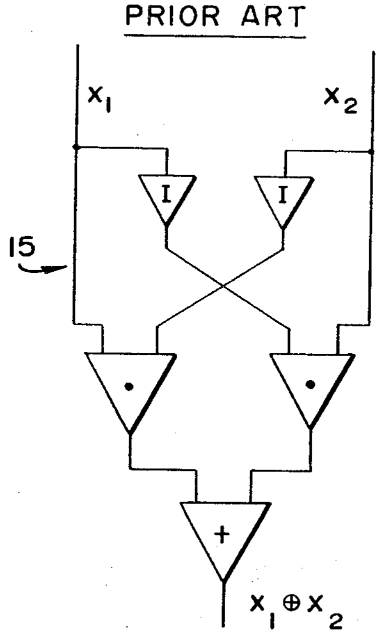
FIG. 4
| 4-BIT BINARY TRUTH TBL. | MOD-2 FUNC. | | |
|---|---|---|---|
| 0 0 0 0 | 0 | [0] | (0) |
| 0 0 0 1 | 1 | | |
| 0 0 1 0 | 1 | | |
| 0 0 1 1 | 0 | | |
| 0 1 0 0 | 1 | [1] | |
| 0 1 0 1 | 0 | | |
| 0 1 1 0 | 0 | | |
| 0 1 1 1 | 1 | | |
| 1 0 0 0 | 1 | [1] | |
| 1 0 0 1 | 0 | | |
| 1 0 1 0 | 0 | | |
| 1 0 1 1 | 1 | | |
| 1 1 0 0 | 0 | [0] | |
| 1 1 0 1 | 1 | | |
| 1 1 1 0 | 1 | | |
| 1 1 1 1 | 0 | | |
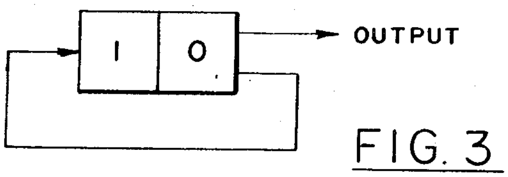
FIG. 3
INVENTOR.
TAGE O. ANDERSON
BY J. N. Warden
Carl G. McCarl
ATTORNEYS TAGE O. ANDERSON
INVENTOR.
BY J. H. Warden
Paul F. McCaul
ATTORNEYS

TAGE O. ANDERSON
INVENTOR.

BY J. H. Warden
Paul F. McCaul
ATTORNEYS

MOD 2 SEQUENTIAL FUNCTION GENERATOR FOR MULTIBIT BINARY SEQUENCE

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to digital circuitry and, more particularly, to a generator for sequentially generating the MOD 2 function of the truth table of a multibit binary sequence.

2. Description of the Prior Art

There are a number of applications in which the MOD 2 function of a multibit binary sequence is required. Among such applications are communication systems in which digital codes are used extensively. Herebefore, the basic technique for generating such a MOD 2 function uses a multilevel array of logic cells, forming MOD 2 adders or Exclusive OR gates which are connected to a binary counter. For each different count of the counter the states of its stages are used to activate the array whose output is either a 1 or a 0 depending on whether the total number of counter stages storing 1's is odd or even.

Such a prior art array for generating the MOD 2 function has two major disadvantages. These include an excessive amount of hardware and an excessive signal propagation time through the array. Thus a need exists for a simpler arrangement to generate the MOD 2 function of a multibit sequence whose various possible combinations are generally represented by its truth table. Alternately stated, a need exists for a simple generator to generate in series the MOD 2 function of entries in a truth table for a multibit binary sequence.

OBJECTS AND SUMMARY OF THE INVENTION

It is a primary object of the present invention to provide a new MOD 2 function generator.

Another object of the invention is to provide a simple MOD 2 function generator from the entries in the truth table of a multibit binary sequence.

A further object of the present invention is to provide a new MOD 2 function generator for sequentially generating the MOD 2 function of the successive entries in a truth table of a multibit binary sequence with less hardware and with a shorter propagation time, i.e., at a fundamentally higher speed, than possible by prior art arrangements.

These and other objects of the present invention are achieved by providing a generator which includes a two-stage shift register for each two bits of the multibit binary sequence. Assuming the sequence to be of $n$ bits, the number of shift registers, R, is $n/2$. If $n$ is odd, $R=(n+1)/2$. In each register the first and second stages represent the input and output bits, respectively. The true output of the second stage represents the register's output. The false output of this stage is fed back to the first stage as the register's true input. The register, associated with the two lowest order bits in the sequence, is clocked at a basic clock rate and the register, associated with each pair of higher order bits, is clocked at one-fourth the rate of the preceding register. The true outputs of the various registers are MOD 2 added to form the generator's final output. In the computer art stages of a register or counter, in which each stage is capable of storing a binary digit or bit, are often referred as bits of the register. For example, a two stage binary counter is often referred to as a two-bit counter. Therefore, hereafter the input and output stages of the shift registers, which form the basic components of the present invention, may be referred to as the input and output bits, respectively.

The novel features of the invention are set forth with particularity in the appended claims. The invention will best be understood from the following description when read in conjunction with the accompanying drawings.

BRIEF DESCRIPTION OF THE DRAWINGS

FIGS. 1 and 2 are block diagrams useful in explaining the prior art;

FIG. 3 is a simple block diagram of a two-bit shift register which forms the basis of the invention;

FIG. 4 is a truth table of a four-bit binary sequence and the MOD 2 function thereof:

DESCRIPTION OF THE PREFERRED EMBODIMENTS

Figure 5:
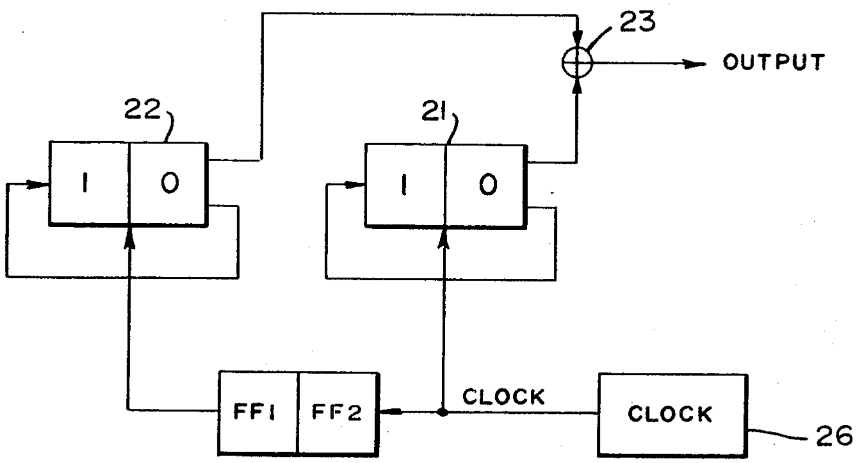
FIGS. 5 and 6 are block diagrams of two different embodiments of the invention.

Before proceeding to explain the present invention, reference is first made to FIG. 1 which represents a block diagram of a prior art arrangement. This figure is included to highlight the disadvantages of the prior art. Basically, in the prior art which will be described in connection with a six-bit binary sequence uses a six-bit counter to define each entry of the truth table sequence. The six-bit counter is designated in FIG. 1 by numeral 10 and is shown including six stages or bits B1-B6. The outputs of these stages, designated X1-X6, are supplied to a logic array 12 consisting of five Exclusive OR gates 15-19. It is the output of gate 19 which represents the MOD 2 function of the six bits. As previously indicated, such an arrangement is quite disadvantageous, since it requires a logic array, such as array 12, which requires a considerable amount of hardware. For the six-bit sequence, five Exclusive OR gates are required. In practice each of these gates, such as gate 15, includes as many as five different gates, as shown in FIG. 2, in order to produce the Exclusive OR function. Also, the array 12 has an excessive propagation time since it consists of three levels and therefore the total propagation time is that through three array levels.

The prior art disadvantages are overcome or greatly reduced by a MOD 2 sequential function generator with a basic mode of operation which may best be explained by first examining the MOD 2 function for a two-bit binary sequence $y_1$ and $y_2$.

| $y_2$ | $y_1$ | MOD 2 |
|---|---|---|
| 0 | 0 | 0 |
| 0 | 1 | 1 |
| 1 | 0 | 1 |
| 1 | 1 | 0 |

Such a function can be generated by a two-bit shift register such as register 20 in FIG. 3. This register's first bit or input bit is set to a 1 and the second bit or output bit to a 0, with the false output of the second bit being fed back to the true input of the input bit. The MOD 2 function for the two-bit binary sequence is provided by the output of the second or output bit.

The binary truth table is highly structured. As seen from FIG. 4, which is a truth table for a four-bit binary sequence and the MOD 2 function therefor, the MOD 2 function then consists of four of the two-bit MOD 2 sequences, two of which are the same as the MOD 2 sequences and two of which are inverted. Defining the four bits of the MOD 2 sequence for a two-bit sequence, such as 0110 as a (0) and 1001 as a (1). The MOD 2 function for a four-bit binary sequence is (0) (1) (1) (0) which is the same as 0110 except at one higher level.

The MOD 2 function for the four-bit binary sequence can then be generated by providing two identical two-bit registers, clocking one at one-fourth the clock rate of the other and MOD 2 adding the outputs of the two registers in a single MOD 2 adder. Such a generator is shown in FIG. 5 wherein the two registers are designated by numerals 21 and 22, and the MOD 2 adder by numeral 23. The division of the clock rate by a factor of 4 for the clocking of register 22 is provided by two flip-flops FF1 and FF2. It is thus seen that for a four-bit binary sequence two identical two-bit shift registers are needed. The clock pulses are assumed to be supplied from clock 26.

It should be stressed that the present invention is not limited to a generator for generating only the MOD 2 function of a four-bit binary sequence. Rather, it is directed to a generator for the MOD 2 function of the binary sequence of any number of bits. Defining the number of registers as $R$ and the number of bits as $n$, $R=n/2$ when n is even or $R=(n+1)/2$ when $n$ is odd.

For example, from an observation of the MOD 2 function of a six-bit binary sequence it is seen that the function consists of a four-bit sequence of ((0)) ((1)) ((1)) ((0)) where (0)) represents sixteen successive bits, such as those forming the MOD 2 function for the four-bit binary sequence (see FIG. 4) and ((1)) represents 1,0,0,1 , 0,1,1,0 , 0,1,1,0 , 1,0,0,1 or (1), (0), (0), (1).

Figure 6:
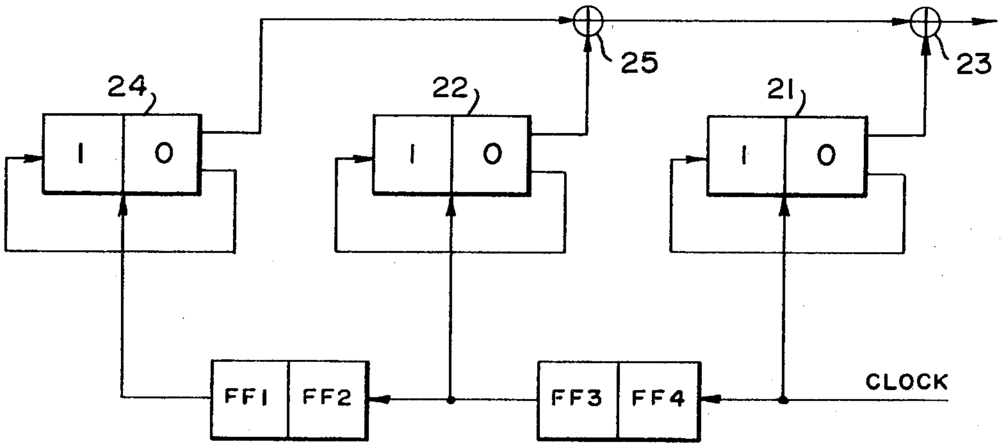

The MOD 2 function for the six-bit binary sequence may be generated by an arrangement as shown in FIG. 6 comprising registers 21, 22 and 24, two MOD 2 adders 23 and 25 and four flip-flops FF1–FF4. The latter cause registers 22 and 24 to be clocked at one-fourth and one-sixteenth the basic clocking rate of register 21.

As should be apparent from FIGS. 5 and 6, in the generator of the present invention the amount of logic circuitry or hardware, necessary to generate the MOD 2 function, is greatly reduced. Also, the propagation time is reduced since the number of levels of MOD 2 addition is reduced as compared with the prior art. Thus, the primary objects of the invention are realized. It should further be appreciated that since the present invention is based on the use of identical two-bit shift registers, simple fabrication techniques may be employed to minimize the cost of the novel generator.

Herebefore it has been assumed that the clock division for each shift register, except for the first shift register, is provided by means of a pair of flip-flops, such as FF1 and FF2. This represents but one example of obtaining clock division, so that each shift register is clocked at one-fourth the clocking rate of the preceding register (as viewed from right to left in FIGS. 5 and 6).

The truth table for each register is as follows:

10

11

01

00

10

Figure 7:
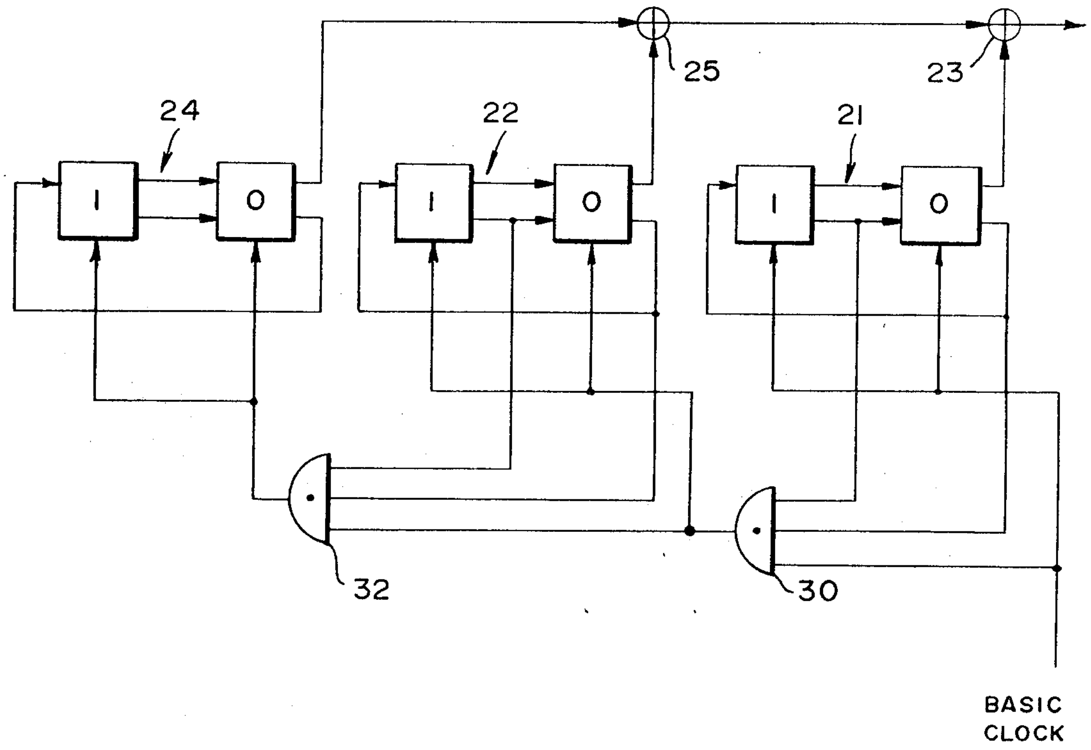
FIG. 7 is a block diagram of yet another embodiment of the invention.

In another embodiment of the invention shown in FIG. 7, the 00 state of each register is used together with a clock pulse which is supplied to the register to enable a three-input AND gate in order to activate or clock the succeeding shift register. As seen from FIG. 7, wherein elements like those shown in FIG. 6 are designated by like numerals, the false outputs of the two bits of register 21 and the clock line on which the basic clock pulses are supplied are connected to an AND gate 30. The output of the latter is used to clock the two bits of the next register 22.

It should be apparent that while register 21 is clocked at the basic clock rate, gate 30 is disabled until the fourth state 00 of register 21. Then the next basic clock pulse to register 21 also enables gate 30 to clock register 22. Thus the latter is clocked at one-fourth the clocking rate of register 21.

In a similar manner the false outputs of the two bits of register 22 together with the output of gate 30 are supplied to an AND gate 32, whose output clocks register 24. It should be apparent that the latter is clocked at one-fourth the clocking rate of register 22 or one-sixteenth the clocking rate of register 21. Thus, it is seen that each pair of flip-flops, shown in FIGS. 5 and 6, may be replaced by a single AND gate to divide the clocking rate so that each register in the sequence is clocked at one fourth the clocking rate of the preceding register.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A MOD 2 function generator for an $n$-bit binary sequence comprising:

a series of $R$ shift registers each shift register including an input stage and an output stage settable to an initial state of a binary 1 and a binary 0, respectively, $R$ being an integer which is equal to $n/2$ when n is even and to $(n+1)/2$ when n is odd;

means in each shift register for connecting the false output of its output to the true input stage of its input stage;

means for clocking the first register in said series at a preselected rate and for clocking each other register at a rate which is one fourth the clocking rate of a preceding register in said sequence; and means for combining the true outputs of the output stages of said $R$ shift registers.

2. The arrangement as recited in claim 1 wherein said means for combining comprise means for MOD 2 adding said true outputs.

3. The arrangement as recited in claim 2 wherein said means for clocking includes at least one pair of flip-flops for providing an output which is at one fourth the rate of the input to said pair.

4. The arrangement as recited in claim 2 wherein said means for clocking include for each register except the last register one gate for providing a true output when the two stages of the register are both in a binary 0 state and the register is clocked by a clock pulse supplied thereto, and means for using the true output of the gate as a clocking pulse for a succeeding register in said series.

5. The arrangement as recited in claim 1 wherein $n$ is either 3 or 4, and $R=2$ and wherein said means for clocking include means for clocking the first shift register in said sequence at a selected rate and means for dividing said selected rate by a factor of four and for supplying the divided clock rate to the second shift register, and said means for combining comprises a MOD 2 adder for MOD 2 adding the outputs of said first and second shift registers.

6. The arrangement as recited in claim 5 wherein said means for dividing comprises a pair of successively connected flip-flops.

7. The arrangement as recited in claim 5 wherein said means for dividing include a single gate, means for connecting said clocking means and the two stages of said first register to the inputs of said gate for enabling said gate to provide a true output when each of the two stages of said first register is in a binary 0 state and said first register is clocked by said clocking means, and means for connecting the output of said gate to said second register for clocking the latter with the true output of said gate.

8. The arrangement as recited in claim 1 wherein $n$ is either 5 or 6 and said series of shift register comprises first, second and third shift registers, said means for clocking include means for clocking said first shift register at a first clocking rate, first clock dividing means for dividing said first clocking rate by 4 to provide a second clocking rate with which said second shift register is clocked and second clock dividing means for dividing said second clocking rate by a factor of 4 to provide a third clocking rate with which said third shift register is clocked, and wherein said means for combining comprises a first MOD 2 adder to which the outputs of said second and third shift registers are supplied and a second MOD 2 adder to which the output of said first shift register and said first MOD 2 adder are supplied.

9. The arrangement as recited in claim 8 wherein each of said first and second clock dividing means comprises a pair of successively connected flip-flops.

* * * * *